(12) United States Patent
Lester, Jr. et al.

(10) Patent No.: US 12,367,324 B2
(45) Date of Patent: Jul. 22, 2025

(54) OPTIMIZATION OF CROSS-SECTIONAL PROFILE SHAPES FOR MANUFACTURE OF STRUCTURAL PARTS

(71) Applicant: The Boeing Company, Chicago, IL (US)

(72) Inventors: Eric S Lester, Jr., Edmonds, WA (US); Vivek Mohan, Everett, WA (US); Venkata Narasimha Ravi Udali, Bothell, WA (US); Shobhit Rastogi, Bothell, WA (US); John Gilotti, Bothell, WA (US); John Henry Moselage, III, Granite Falls, WA (US)

(73) Assignee: The Boeing Company, Arlington, VA (US)

( * ) Notice: Subject to any disclaimer, the term of this patent is extended or adjusted under 35 U.S.C. 154(b) by 995 days.

(21) Appl. No.: 17/377,084

(22) Filed: Jul. 15, 2021

(65) Prior Publication Data

US 2022/0067223 A1    Mar. 3, 2022

Related U.S. Application Data

(60) Provisional application No. 63/073,729, filed on Sep. 2, 2020.

(51) Int. Cl.
*G06F 30/10* (2020.01)
*G06F 16/953* (2019.01)
(Continued)

(52) U.S. Cl.
CPC ............ *G06F 30/10* (2020.01); *G06F 16/953* (2019.01); *G06N 5/04* (2013.01); *G06N 20/00* (2019.01); *G06Q 10/087* (2013.01)

(58) Field of Classification Search
CPC .... G06F 30/10; G06F 16/953; G06F 2111/20; G06F 30/17; G06N 5/04; G06N 20/00; G06N 3/08; G06Q 10/087
(Continued)

(56) References Cited

U.S. PATENT DOCUMENTS 10,295,438 B2    5/2019   Lester et al.
2018/0136793 A1*  5/2018   Kohlhoff .................. G09B 5/02
2018/0285460 A1* 10/2018   Li ....................... G06Q 30/0641

FOREIGN PATENT DOCUMENTS

CN    101391896 A   *  3/2009
CN    102768700 A   * 11/2012 ............. G06F 30/23
(Continued)

*Primary Examiner* — Bijan Mapar
(74) *Attorney, Agent, or Firm* — Harrity & Harrity, LLP

(57) ABSTRACT

A method of manufacturing a structural part includes accessing memory storing code for a software tool to determine a template profile for the structural part. The method includes executing the code to cause an apparatus to execute the software tool for accessing a 3D model of the structural part. The method also includes generating a profile from the 3D model and dimensioning the profile, and accessing and searching a database for stock profiles that match search criteria that include the dimension measurements of the profile set as lower bounds of the corresponding dimension measurements. The method also includes performing a decision analysis to evaluate attributes of the matching stock profiles and identify a selected stock profile. The method also includes outputting an indication of the selected stock profile for manufacturing the structural part from a stock structural part having a cross-sectional profile corresponding to the selected stock profile.

20 Claims, 12 Drawing Sheets

(51) Int. Cl.
  *G06N 5/04*    (2023.01)
  *G06N 20/00*   (2019.01)
  *G06Q 10/087*  (2023.01)

(58) Field of Classification Search
  USPC .............................................................. 703/6
  See application file for complete search history.

(56) References Cited

FOREIGN PATENT DOCUMENTS

| CN | 107106071 A | * | 8/2017 | ............. G06H 50/50 |
| CN | 107818196 A | * | 3/2018 | ............. G06F 30/17 |
| JP | 3125791 B2  | * | 1/2000 | ....... G05B 19/41865 |
| JP | 3884195 B2  | * | 2/2007 | ............. Y02P 90/30 |
| JP | 103079494 A | * | 5/2013 | |

* cited by examiner

OPTIMIZATION OF CROSS-SECTIONAL PROFILE SHAPES FOR MANUFACTURE OF STRUCTURAL PARTS

CROSS-REFERENCE TO RELATED APPLICATION(S)

This application claims priority to U.S. Provisional Application No. 63/073,729, filed Sep. 2, 2020, entitled OPTIMIZATION OF CROSS-SECTIONAL PROFILE SHAPES FOR MANUFACTURE OF STRUCTURAL PARTS, the content of which is incorporated herein by reference in its entirety.

TECHNOLOGICAL FIELD

The present disclosure relates generally to the manufacture of structural parts and, in particular, to optimization of cross-sectional profile shapes for manufacture of structural parts.

BACKGROUND

Aircrafts may comprise metal and composite frames which are made of material grades such as aluminum or titanium, which has prompted the fabrication of structural elements of such frames, e.g., skins, spars, ribs, and stringers thereof. Metallic cross-section shapes are typically manufactured using extrusion processes for raw materials and machined to achieve the desired geometry of profile shapes.

As part of the fabrication, manufacturing databases may contain numerous stock profiles from multiple suppliers. Existing processes may involve identifying desired stock profiles for such structures from the database. Multiple steps may be considered based on various design or manufacturing attributes and may require a significant amount of manual effort and thereby consume considerable time. It may be beneficial to automate the fabrication procedure to produce metallic structures rapidly, accurately, and repeatedly with a minimum amount of manual labor, thereby resulting in metallic structures that are strong, reliable, and cost-effective.

Therefore, it would be desirable to have a system and method that takes into account at least some of the issues discussed above, as well as other possible issues.

BRIEF SUMMARY

Example implementations of the present disclosure are directed to the manufacture of structural parts and, in particular, to optimization of cross-sectional profile shapes for manufacture of structural parts. In accordance with example implementations, multiple manual processes may be integrated into one seamlessly integrated and automated process by identifying desired and common stock profiles based on various design and/or manufacturing attributes. The seamless integration may thus eliminate redundancy and conflict with other similar profiles from suppliers by using stock profiles as will be further disclosed.

A three-dimensional (3D) model of a structural part may be accessed and a profile may be generated from the 3D model in a two-dimensional (2D) plane. A manufacturing database of stock profiles may be accessed having corresponding dimension measurements and respective attributes. The manufacturing database may be searched for stock profiles that match search criteria, thereby matching stock profiles. A multiple-criteria decision analysis may be performed to evaluate the respective attributes of the matching stock profiles and identify a selected stock profile therefrom. An indication of the selected stock profile may then be output.

The present disclosure thus includes, without limitation, the following example implementations.

Some example implementations provide a method of manufacture of a structural part, the method comprising: accessing memory storing computer-readable program code for a software tool to determine a template profile for the structural part; and executing the computer-readable program code, via processing circuitry configured to access the memory, to cause an apparatus to execute the software tool for at least: accessing a three-dimensional (3D) model of the structural part; generating a profile from the 3D model in a two-dimensional (2D) plane, generating the profile including dimensioning the profile with dimension measurements; accessing a manufacturing database of stock profiles with corresponding dimension measurements and respective attributes; searching the manufacturing database for those of the stock profiles that match search criteria and that are thereby matching stock profiles, the search criteria including the dimension measurements of the profile set as lower bounds of the corresponding dimension measurements; performing a multiple-criteria decision analysis to evaluate the respective attributes of the matching stock profiles based on multiple selection criteria, and identify a selected stock profile from the matching stock profiles based on the evaluation; and outputting an indication of the selected stock profile for use in manufacturing the structural part from a stock structural part having a cross-sectional profile that corresponds to the selected stock profile.

In some example implementations of the method of any preceding example implementation, or any combination of any preceding example implementations, generating the profile comprises: projecting a silhouette edge of the 3D model onto the 2D plane; and generating the profile from the silhouette edge.

In some example implementations of the method of any preceding example implementation, or any combination of any preceding example implementations, generating the profile comprises: extracting section cuts of the 3D model onto the 2D plane, the section cuts forming cross sections that have a cross-sectional profile of the structural part; and generating the profile from maximum dimensions across the cross sections.

In some example implementations of the method of any preceding example implementation, or any combination of any preceding example implementations, generating the profile further comprises: modifying one or more of the dimension measurements by at least one of a predefined dimensional tolerance or according to user input; and regenerating the profile to include the dimension measurements as modified.

In some example implementations of the method of any preceding example implementation, or any combination of any preceding example implementations, searching the manufacturing database includes data scraping the software tool to extract the dimension measurements to a graphical user interface (GUI) of a search engine for the manufacturing database, the GUI including graphical control elements configured to accept the dimension measurements.

In some example implementations of the method of any preceding example implementation, or any combination of any preceding example implementations, the manufacture of the structural part is related to a program for production of a machine that includes the structural part, and the dimension measurements of the stock profiles include geometric area, and the respective attributes of the stock profiles include one or more of cost, weight, usage in the program, production quantity, or forecasted quantity, and the multiple-criteria decision analysis is performed based on the multiple selection criteria including multiple ones of minimizing material wastage that is reflected in the geometric area, minimizing one or more of cost or weight, or maximizing one or more of usage in the program, production quantity, or forecasted quantity.

In some example implementations of the method of any preceding example implementation, or any combination of any preceding example implementations, the multiple-criteria decision analysis is performed using a machine learning algorithm.

In some example implementations of the method of any preceding example implementation, or any combination of any preceding example implementations, performing the multiple-criteria decision analysis includes determining an order of priority of the matching stock profiles based on the evaluation, and the indication of the selected stock profile includes an indication of a subset of the matching stock profiles including the selected stock profile that are higher in the order of priority.

In some example implementations of the method of any preceding example implementation, or any combination of any preceding example implementations, outputting the indication of the selected stock profile includes generating an output display including the profile overlaid on the selected stock profile.

In some example implementations of the method of any preceding example implementation, or any combination of any preceding example implementations, performing the multiple-criteria decision analysis includes determining an order of priority of the matching stock profiles based on the evaluation, and generating the output display includes generating the output display including the profile overlaid on a subset of the matching stock profiles including the selected stock profile that are higher in the order of priority.

Some example implementations provide an apparatus for manufacture of a structural part, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for manufacture of a structural part, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 8A:
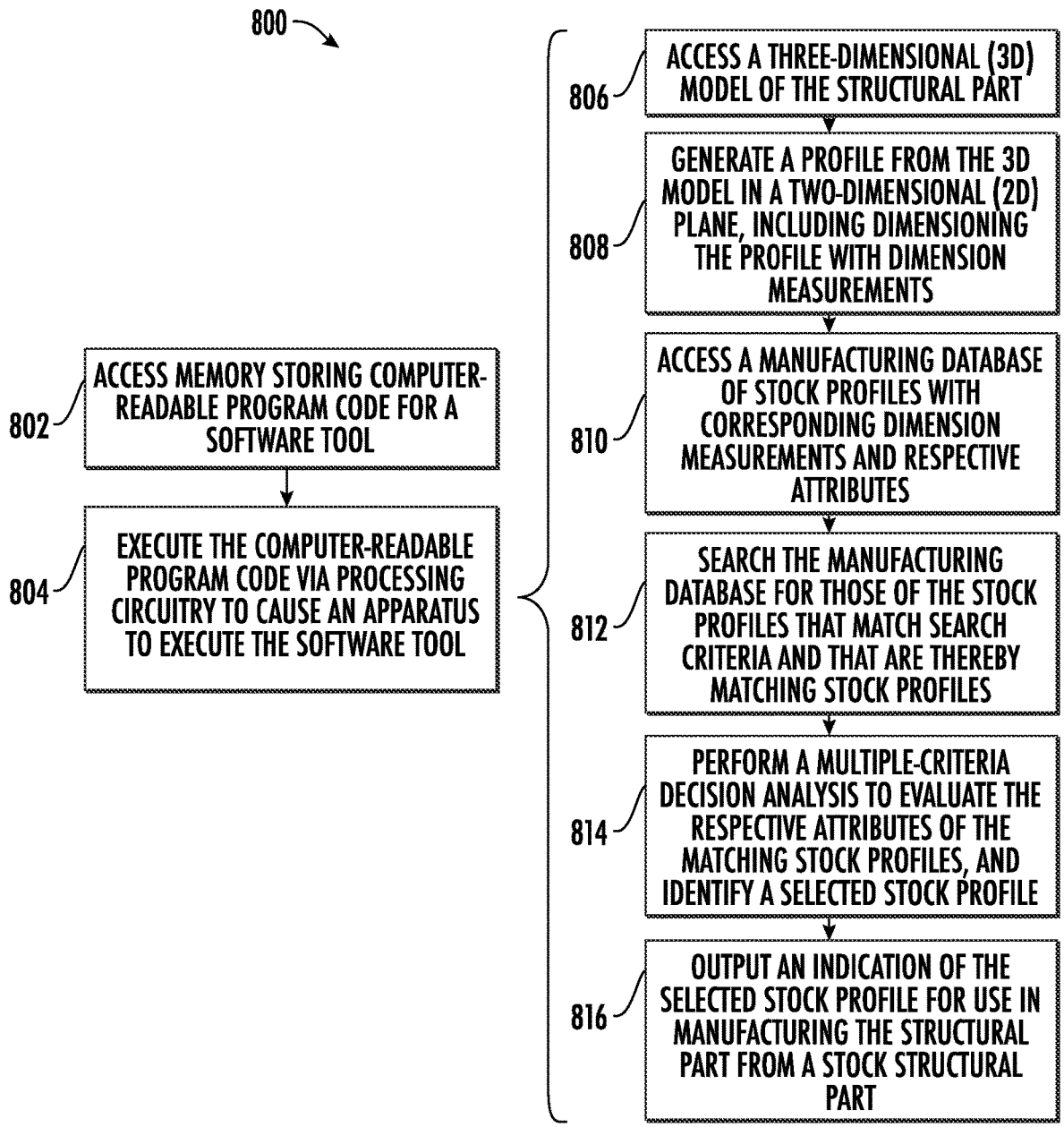
Figure 8B:
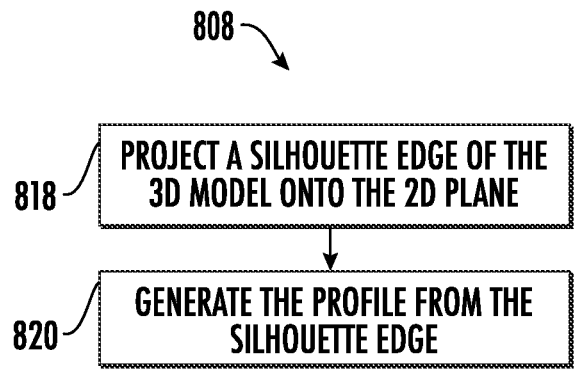
Figure 8C:
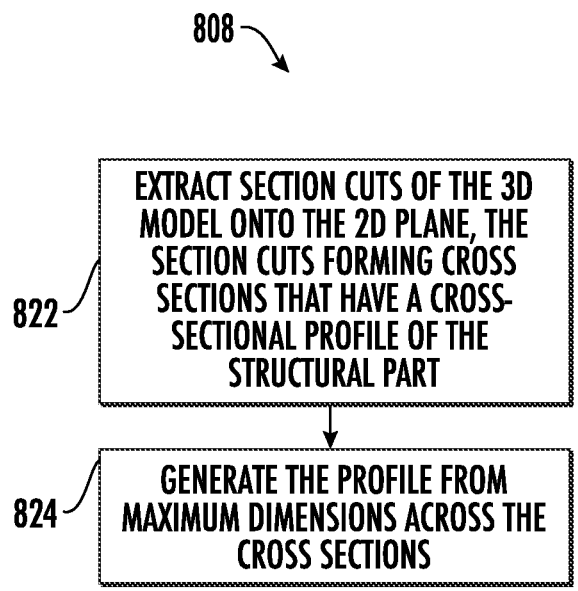
Figure 8D:
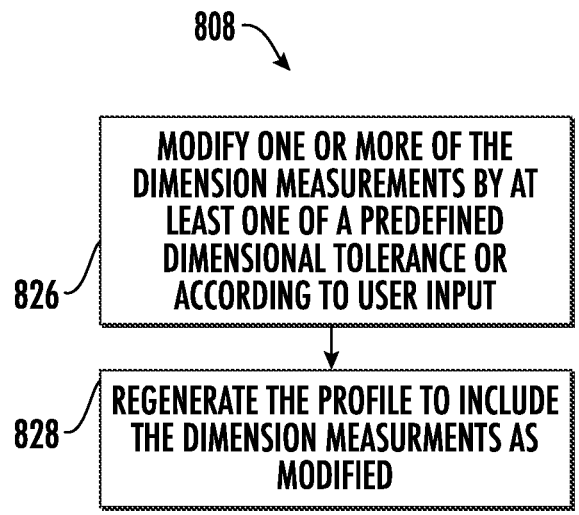
Figure 8E:
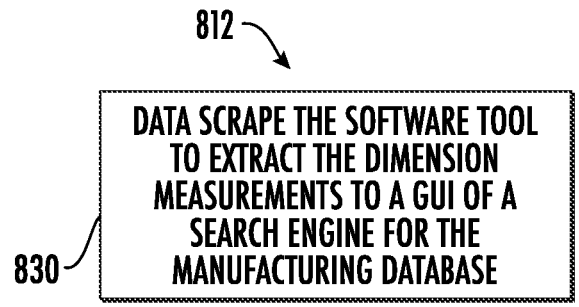
Figure 8F:
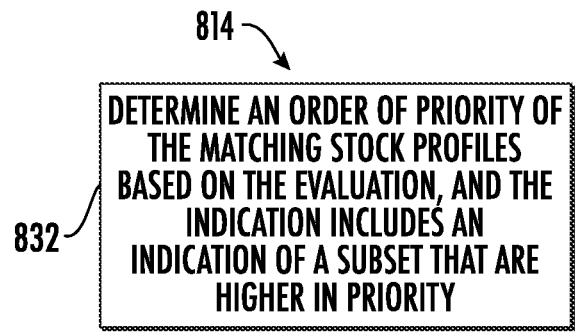
Figure 8G:
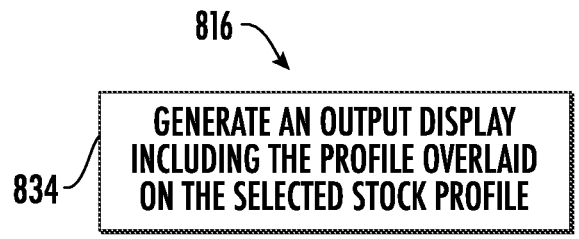
Figure 8H:
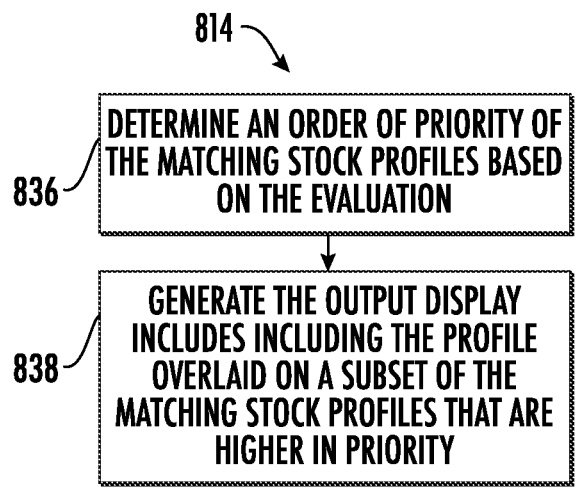
Figure 9:
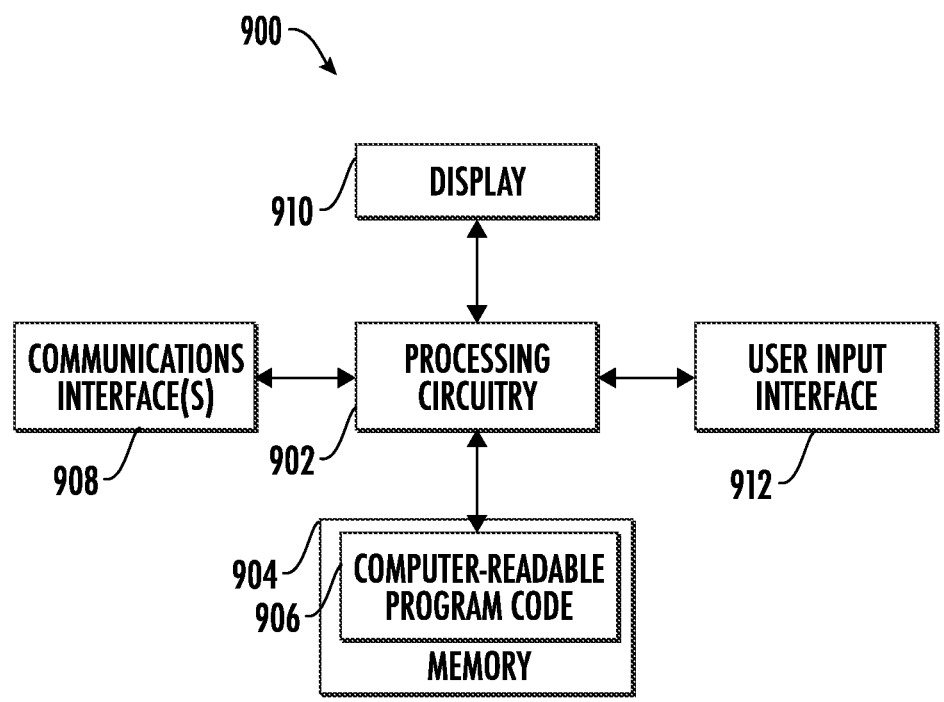

FIGS. 8A, 8B, 8C, 8D, 8E, 8F, 8G, and 8H are flowcharts illustrating various steps in a method of manufacture of a structural part, according to example implementations; and FIG. 9 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure are directed to manufacture of structural parts and, in particular, to optimization of cross-sectional profile shapes for manufacture of structural parts. The feature described herein may be beneficial for reducing or eliminating redundancies and conflicts with similar part profiles from suppliers, thereby reducing costs related to material procurement and manufacturing, as well as reducing time delays associated with finding and determining a desired stock profile for a part by conventional means. References to "extrusion" or the like may include pushing or drawing material through a die of a desired shape having a desired cross-sectional profile.

Figure 1:
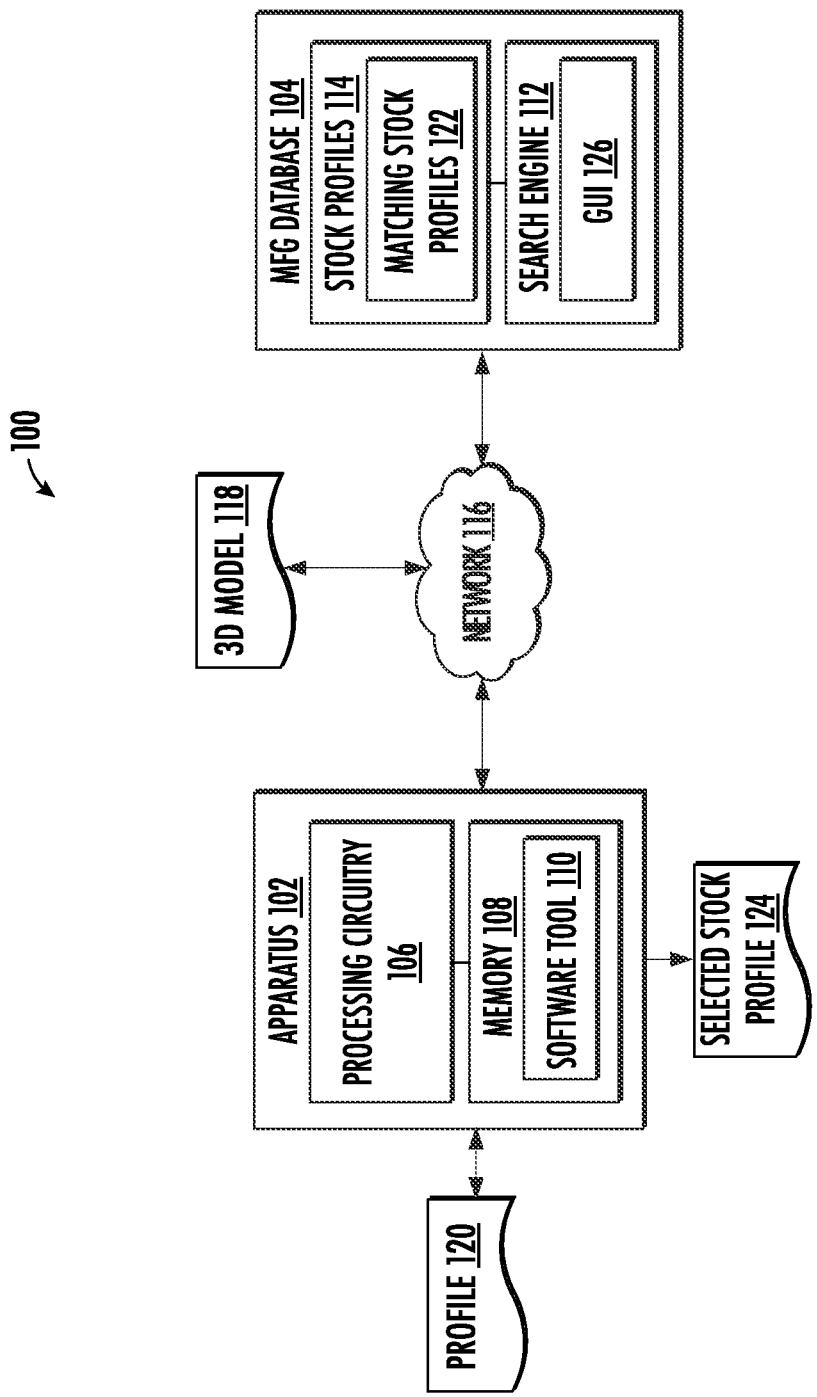
FIG. 1 illustrates a system for manufacture of a structural part, according to example implementations of the present disclosure.

FIG. 1 illustrates a system 100 for manufacture of a structural part, according to example implementations of the present disclosure. The system may include any of a number of different subsystems (each an individual system) for performing one or more functions or operations. As shown, in some examples, the system includes an apparatus 102 and a manufacturing (MFG) database 104. As also shown, the apparatus includes processing circuitry 106, and memory 108 storing computer-readable program code for a software tool 110 to determine a template profile for the structural part, which may be considered an optimal template profile for the structural part. The manufacturing database includes a search engine 112 and stock profiles 114. The subsystems including the apparatus and manufacturing database may be co-located or directly coupled to one another, or in some examples, various ones of the subsystems may communicate with one another across one or more computer networks 116. Further, although shown as part of the system, it should be understood that any one or more of the above may function or operate as a separate system without regard to any of the other subsystems. It should also be understood that the system may include one or more additional or alternative subsystems than those shown in FIG. 1.

According to example implementations of the present disclosure, the processing circuitry 106 of the apparatus 102 is configured to access the memory 108 and execute the computer-readable program code for the software tool 110, to cause the apparatus to execute the software tool to perform a number of operations to determine the desired template profile for a structural part. In this regard, the software tool is configured to access a three-dimensional (3D) model 118 of the structural part. In some examples, the 3D model may be accessed from or the software tool may otherwise interact with, a commercially-available computer-aided design (CAD) system, such as CATIA, SolidWorks, or the like, available from Dassault Systèmes S.A. of Vélizy-Villacoublay, France.

The software tool 110 is configured to generate a profile 120 from the 3D model 118 in a two-dimensional (2D) plane, and dimension the profile with dimension measurements. In some examples, the software tool is configured to project a silhouette edge of the 3D model onto the 2D plane and generate the profile from the silhouette edge.

Figure 2:
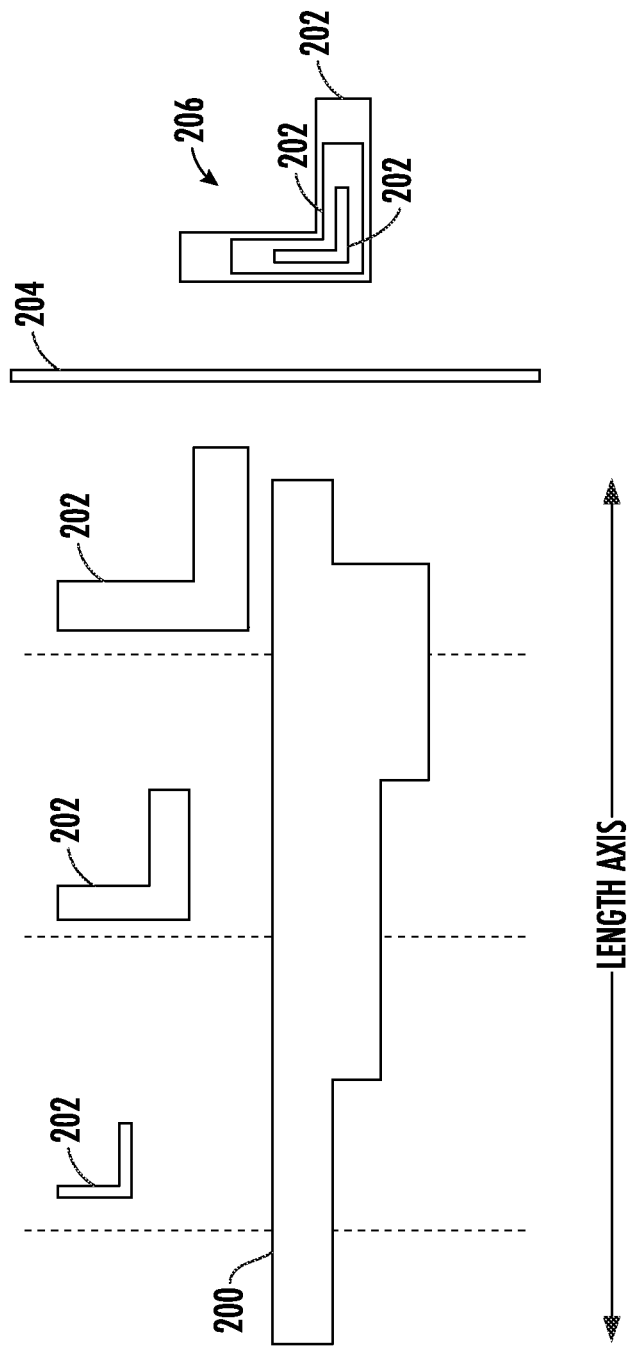
FIGS. 2 and 3 illustrate example three-dimensional (3D) models of structural parts and including section cuts from the structural parts, according to example implementations.

In some examples, the software tool 110 is configured to extract section cuts of the 3D model 118 onto the 2D plane, and generate the profile from maximum dimensions across the cross sections. In this regard, the section cuts may form cross sections that have a cross-sectional profile of the structural part. FIG. 2 illustrates an example 3D model 200 of a structural part with section cuts 202 extracted along its length axis. Also shown is the section cuts projected onto a 2D plane 204, and a profile 206 generated from those section cuts. In this example, the profile is a maximum profile shape, which corresponds to one of the section cuts.

Figure 3:
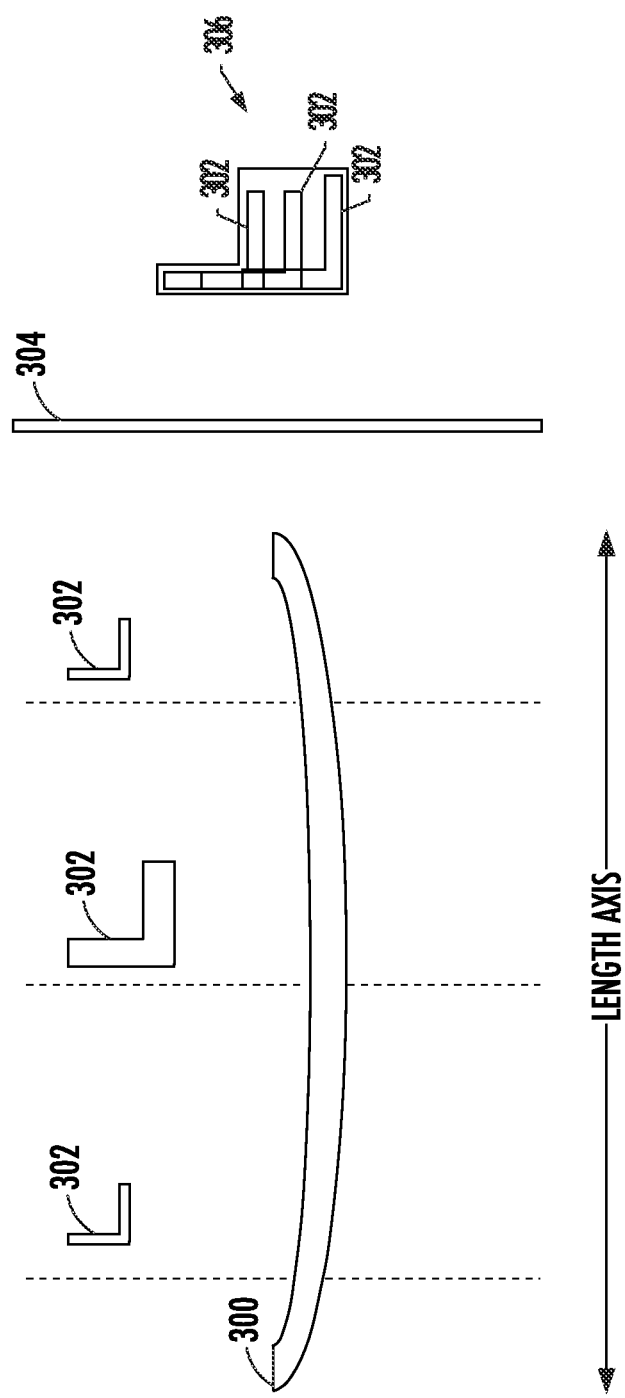

FIG. 3 illustrates another example 3D model 300 of a structural part that is stretch formed with section cuts 302 extracted along its length axis. Also shown is the section cuts projected onto a 2D plane 304, and a profile 306 generated from those section cuts in which the profile, similar to the example shown in FIG. 2, is a maximum profile shape.

In some examples, the software tool 110 is further configured to modify one or more of the dimension measurements of the profile 120 by a predefined dimensional tolerance. Additionally or alternatively, in some examples, the software tool is further configured to modify one or more of the dimension measurements according to user input. The apparatus may also be caused to regenerate the profile to include the dimension measurements as modified.

Figure 4:
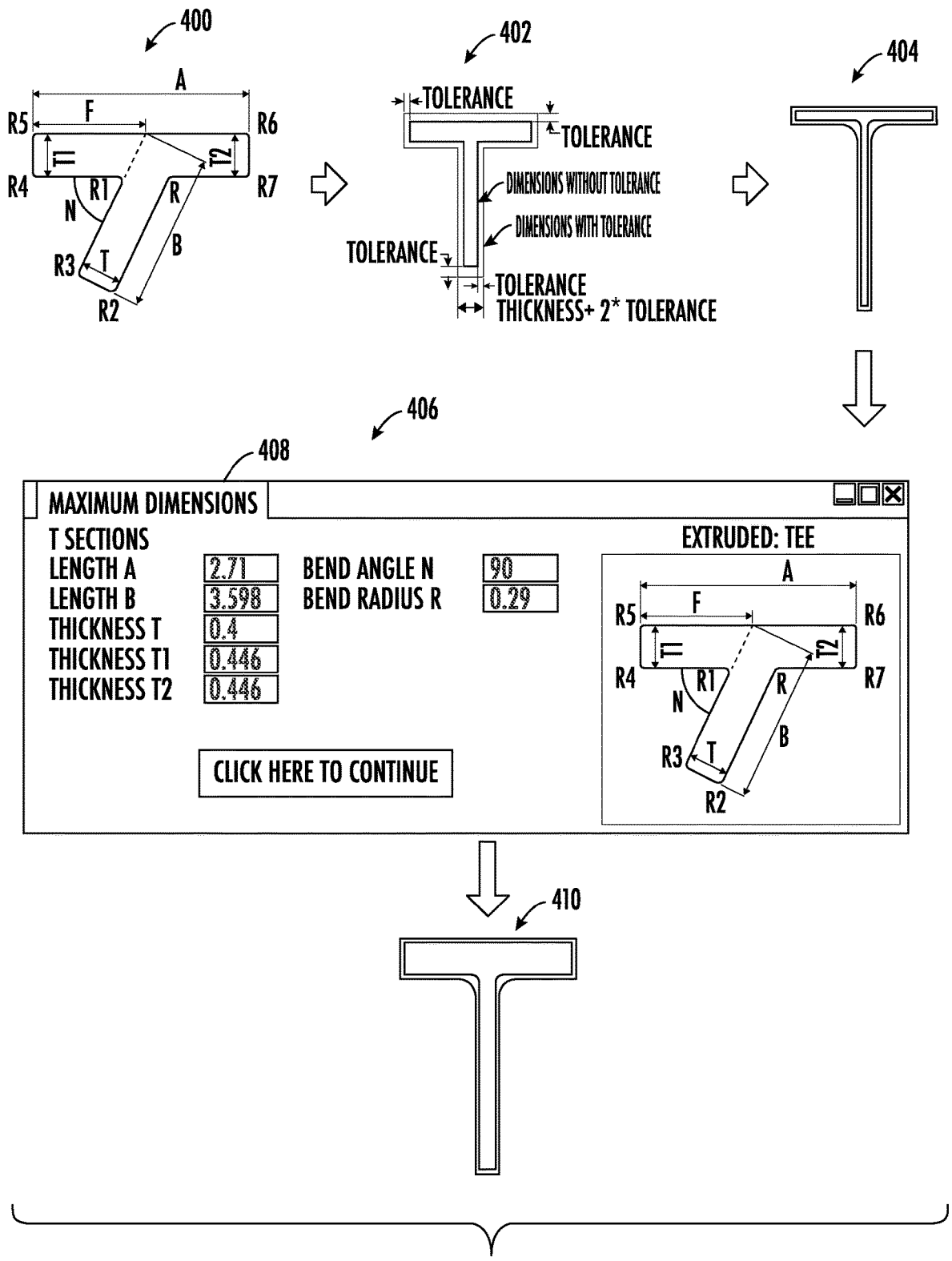
FIG. 4 illustrates operations to generate a profile, according to example implementations.

FIG. 4 illustrates an example in which a profile 400 is generated and dimensioned with dimension measurements. As shown, one or more of the dimension measurements may be modified by a predefined dimensional tolerance 402, and the profile is regenerated 404. As also shown, one or more of the dimension measurements may be modified according to user input 406. In this regard, a graphical user interface (GUI) 408 may include graphical control elements with the dimension measurements at least some of which are editable according to user input. And again, the profile may be regenerated 410.

Returning to FIG. 1, the software tool 110 is configured to access the manufacturing database 104 of stock profiles 114 with corresponding dimension measurements and respective attributes. The software tool may be configured to search the manufacturing database for those of the stock profiles that match search criteria and that are thereby matching stock profiles 122, and the search criteria may include the dimension measurements of the profile set as lower bounds of the corresponding dimension measurements.

The software tool 110 may be configured to perform a multiple-criteria decision analysis to evaluate the respective attributes of the matching stock profiles 122 based on multiple selection criteria, and identify a selected stock profile 124 from the matching stock profiles based on the evaluation. And the software tool may be configured to output an indication of the selected stock profile for use in manufacturing the structural part from a stock structural part. In some examples, the stock structural part has a respective fixed cross-sectional profile that corresponds to the selected stock profile.

Figure 5:
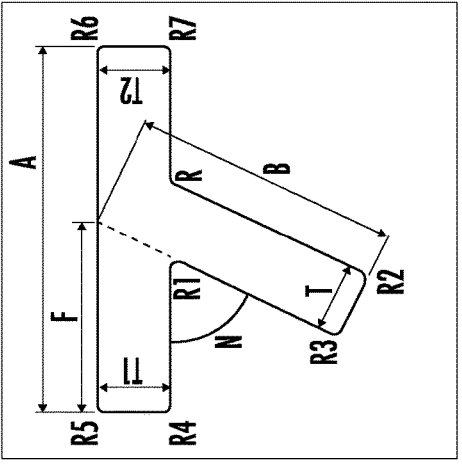
FIG. 5 illustrates an example of a graphical user interface for searching a manufacturing database of stock profiles, according to example implementations.

In some more particular examples, the software tool 110 configured to search the manufacturing database 104 includes a data scrape of the software tool to extract the dimension measurements to a GUI 126 of the search engine 112 of the manufacturing database. In some of these examples, the GUI includes graphical control elements configured to accept the dimension measurements. FIG. 5 illustrates an example of a suitable GUI 500 that includes graphical control elements 502 configured to accept dimension measurements, as well as selection of various sorting options 504, for stock profiles 114 in the manufacturing database. In some examples, the graphical control elements may be automatically populated from a data scrape of the software tool, or more particularly a GUI of the software tool such as the GUI 408 shown in FIG. 4.

Again returning to FIG. 1, in some examples, the manufacture of the structural part is related to a program for production of a machine such as an aircraft or other vehicle that includes the structural part. The dimension measurements of the stock profiles 114 may include geometric area, and the respective attributes of the stock profiles may include one or more of cost, weight, usage in the program, production quantity, or forecasted quantity. In some of these examples, the software tool 110 is configured to perform the multiple-criteria decision analysis based on the multiple selection criteria. The multiple selection criteria may include multiple ones of minimizing material wastage reflected in the geometric area, minimizing one or more of cost or weight, or maximizing one or more of usage in the program, production quantity, or forecasted quantity. In some examples, the multiple-criteria decision analysis is performed using a machine learning (ML) algorithm.

In some examples, using an ML algorithm may include shape learning/intelligence used by a neural network. Artificial intelligence (AI) based machine learning solutions may be implemented using an artificial neural network (ANN) to predict and suggest the selected stock profile 124 for the shape. ML solutions may also be implemented to test and train the software tool 110 to predict and suggest stock profiles based on previous predictions. shape learning/intelligence may include storing information from shape profile libraries and a shape characteristics library as profile data into the manufacturing database 104. Inputs may be provided to the ANN and the AI technique may be applied to test and train all the stock profiles 114. From the training and testing, the selected stock profile may be predicted based on an ML profile classifier taking into consideration various selection criteria.

A stock profile may be assigned a consolidated ranking used to prioritize the stock profiles 114. As an example, the consolidated ranking may be a type of weighted average of rankings of the stock profile for respective ones of the multiple selection criteria relative to others of the stock profiles. In another example, the consolidated ranking may be assigned based on the ML algorithm.

Figure 6:
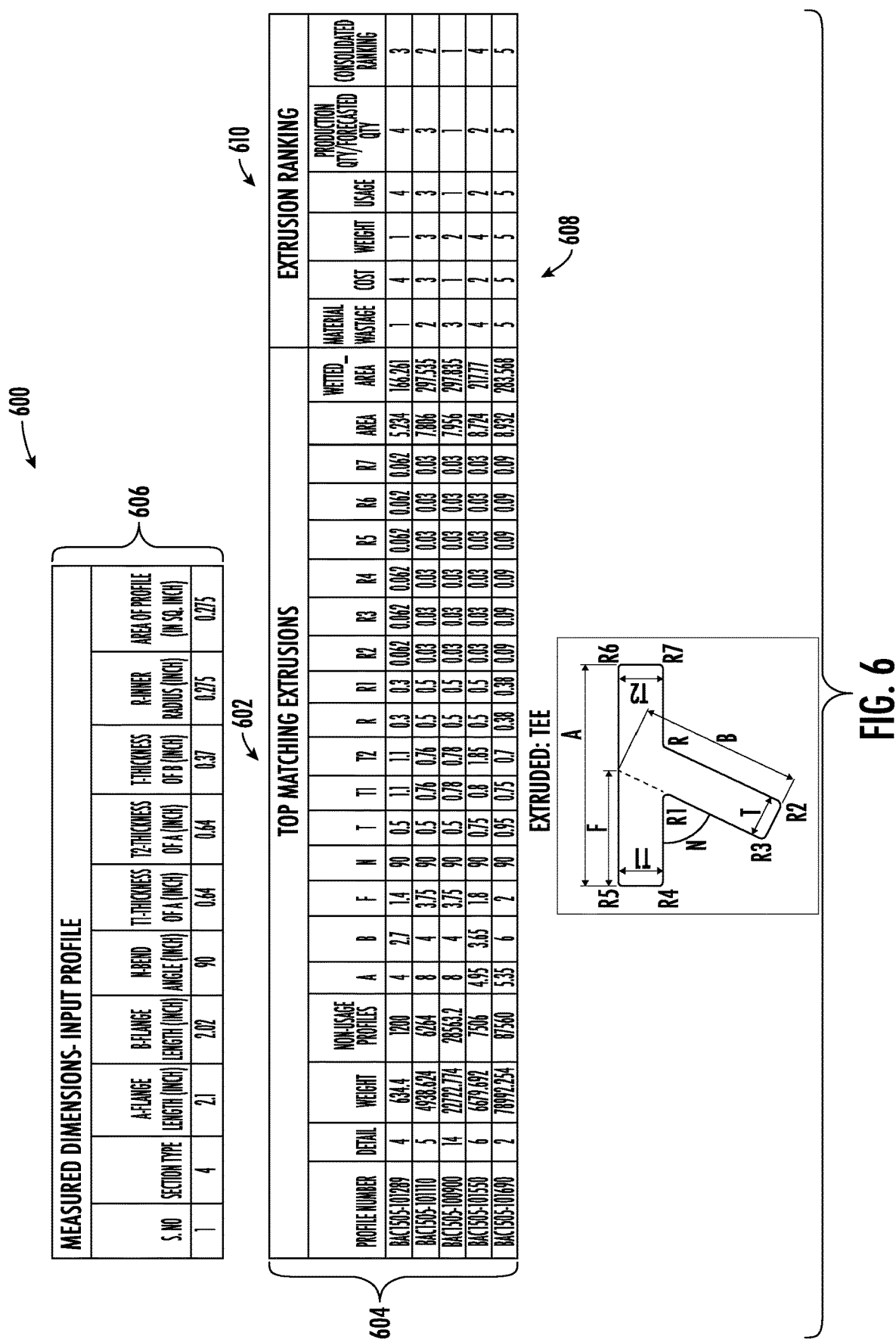
FIG. 6 illustrates a consolidated ranking of stock profiles, according to example implementations.

In some examples, the multiple-criteria decision analysis includes the software tool 110 configured to determine an order of priority of the matching stock profiles 122 based on the evaluation. In some of these examples, the indication of the selected stock profile 124 includes an indication of a subset of the matching stock profiles including the selected stock profile that are higher in the order of priority. FIG. 6 shows an indication 600 of a subset 602 of matching stock profiles that are higher in order of priority, according to some examples. Also shown are attributes 604 of the matching stock profiles, and measured dimensions 606 of the profile 120. Further, the indication includes rankings 608 of the matching stock profiles for respective ones of the multiple selection criteria, and consolidated rankings 610 of the matching stock profiles.

Figure 7:
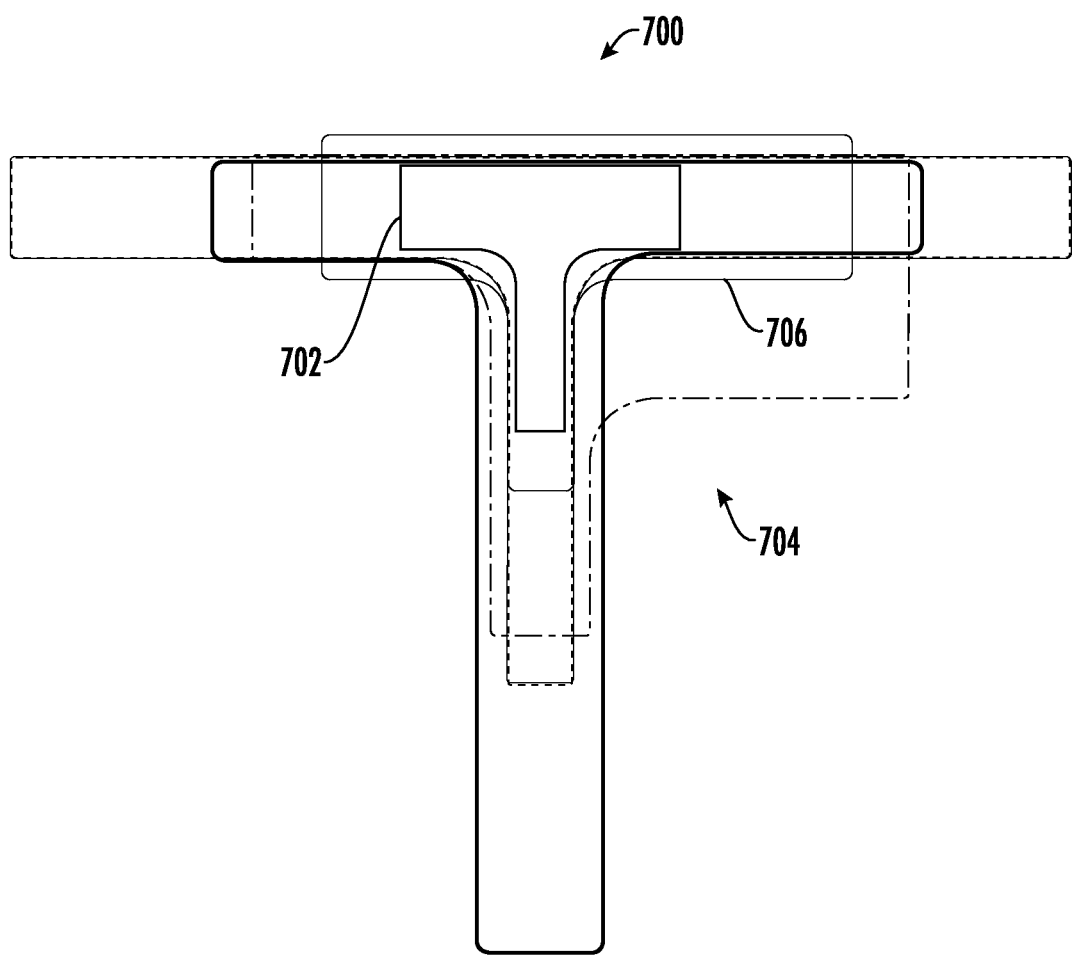
FIG. 7 illustrates an example output of a table of extrusion values corresponding to the consolidated ranking of stock profiles shown in FIG. 5, according to example implementations.

In some examples, the software tool 110 is configured to generate an output display including the profile 120 overlaid on the selected stock profile 124. In these examples, in which the multiple-criteria decision analysis includes an order of priority of the matching stock profiles 122, the output display may include the profile overlaid on a subset of the matching stock profiles including the selected stock profile that are higher in the order of priority. FIG. 7 shows an output display 700 including the profile 702 overlaid on a subset of matching stock profiles 704 that are higher in order of priority, and including the selected stock profile 706, according to example implementations.

In some examples, the structural part is manufactured from the selected stock profile 124. The selected stock profile may be assigned to the 2D and 3D models of the structural part and then further review may be performed to provide design change recommendations. Once the design review is completed, it may be sent to a supplier(s) to procure the selected stock profile. Once the supplier(s) provides the selected stock profiles, it will then be machined to achieve the desired geometry based on the 2D and 3D model specifications. The final manufactured structural part yields optimized cost for the selected stock profile and limits material waste.

FIGS. 8A, 8B, 8C, 8D, 8E, 8F, 8G and 8H are flowcharts illustrating various steps in a method 800 of manufacture of a structural part, according to example implementations of the present disclosure. The method includes accessing memory 108 storing computer-readable program code for a software tool 110 to determine a template profile for the structural part, as shown at block 802. The method also includes executing the computer-readable program code, via processing circuitry 106 configured to access the memory, to cause an apparatus 102 to execute the software tool for performing a number of operations, as shown at block 804.

As shown at blocks 806 and 808, the software tool 110 is executed for accessing a 3D model 118 of the structural part, and generating a profile 120 from the 3D model 118 in a 2D plane, including dimensioning the profile with dimension measurements. The software tool is also executed for accessing a manufacturing database 104 of stock profiles 114 with corresponding dimension measurements and respective attributes, and searching the manufacturing database for those of the stock profiles that match search criteria and that are thereby matching stock profiles 122, as shown at blocks 810 and 812. In this regard, the search criteria include the dimension measurements of the profile set as lower bounds of the corresponding dimension measurements.

A multiple-criteria decision analysis is performed to evaluate the respective attributes of the matching stock profiles 122 based on multiple selection criteria, and identify a selected stock profile 124 from the matching stock profiles based on the evaluation, as shown at block 814. And an indication of the selected stock profile is output for use in manufacturing the structural part from a stock structural part having a cross-sectional profile that corresponds to the selected stock profile, as shown at block 816.

In some examples, generating the profile 120 at block 808 includes projecting a silhouette edge of the 3D model 118 onto the 2D plane, and generating the profile from the silhouette edge, as shown at blocks 818 and 820 of FIG. 8B.

In some examples, generating the profile 120 at block 808 includes extracting section cuts of the 3D model 118 onto the 2D plane, the section cuts forming cross sections that have a cross-sectional profile of the structural part, as shown at block 822 of FIG. 8C. In some of these examples, the profile is generated from maximum dimensions across the cross sections, as shown at block 824.

In some examples, generating the profile 120 at block 808 includes modifying one or more of the dimension measurements by at least one of a predefined dimensional tolerance or according to user input, as shown at block 826 of FIG. 8D.

In some of these examples, generating the profile includes regenerating the profile to include the dimension measurements as modified, as shown at block 828.

In some examples, searching the manufacturing database 104 at block 812 includes data scraping the software tool 110 to extract the dimension measurements to a GUI 126 of a search engine 112 for the manufacturing database, as shown at block 830 of FIG. 8E. In some of these examples, the GUI includes graphical control elements configured to accept the dimension measurements.

In some examples, performing the multiple-criteria decision analysis at block 814 includes determining an order of priority of the matching stock profiles 122 based on the evaluation, as shown at block 832 of FIG. 8F. In some of these examples, the indication of the selected stock profile 124 includes an indication of a subset of the matching stock profiles including the selected stock profile that are higher in the order of priority.

In some examples, outputting the indication of the selected stock profile 124 at block 816 includes generating an output display including the profile 120 overlaid on the selected stock profile, as shown at block 834 of FIG. 8G.

In some examples, performing the multiple-criteria decision analysis at block 814 includes determining an order of priority of the matching stock profiles 122 based on the evaluation, as shown at block 836 of FIG. 8H. In some of these examples, generating the output display includes generating the output display including the profile 120 overlaid on a subset of the matching stock profiles including the selected stock profile 124 that are higher in the order of priority, as shown at block 838.

According to example implementations of the present disclosure, the system 100 and its subsystems including the apparatus 102 and the manufacturing database 104 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

FIG. 9 illustrates an apparatus 900 according to some example implementations of the present disclosure, such as the apparatus 102 of system 100 shown in FIG. 1. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 902 (e.g., processor unit) connected to a memory 904 (e.g., storage device). The processing circuitry 902 may correspond to processing circuitry 106 and memory 904 may correspond to memory 108, as shown in apparatus 102 of system 100 in FIG. 1.

The processing circuitry 902 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 904 (of the same or another apparatus).

The processing circuitry 902 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 904 is generally any piece of computer hardware that is capable of storing information such as, for example, data, computer programs (e.g., computer-readable program code 906) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 904, the processing circuitry 902 may also be connected to one or more interfaces for displaying, transmitting and/or receiving information. The interfaces may include a communications interface 908 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 910 and/or one or more user input interfaces 912 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 900 may include a processing circuitry 902 and a computer-readable storage medium or memory 904 coupled to the processing circuitry, where the processing circuitry is configured to execute computer-readable program code 906 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of manufacture of a structural part, the method comprising:
   accessing memory storing computer-readable program code for a software tool to determine a template profile for the structural part; and
   executing the computer-readable program code, via processing circuitry configured to access the memory, to cause an apparatus to execute the software tool for at least:
      accessing a three-dimensional (3D) model of the structural part;
      generating a profile from the 3D model in a two-dimensional (2D) plane,
         wherein generating the profile including dimensioning the profile with dimension measurements;
      accessing a manufacturing database of stock profiles with corresponding dimension measurements and respective attributes;
      searching the manufacturing database for the stock profiles that match search criteria and that are thereby matching stock profiles,
         wherein the search criteria including the dimension measurements of the profile as lower bounds of the corresponding dimension measurements;
      performing a multiple-criteria decision analysis to evaluate the respective attributes of the matching stock profiles based on multiple selection criteria, and identifying a selected stock profile from the matching stock profiles based on the evaluation,
         wherein performing the multiple-criteria decision analysis includes determining an order of priority of the matching stock profiles based on the evaluation; and
      manufacturing the structural part from a stock structural part associated with an indication of the selected stock profile, the selected stock profile having a cross sectional profile that corresponds to the selected stock profile from the 3D model in the 2D plane,
         wherein producing the selected stock profile includes an indication of a subset of the matching stock profiles including the selected stock profile that are higher in the order of priority.

2. The method of claim 1, wherein generating the profile comprises:
   projecting a silhouette edge of the 3D model onto the 2D plane; and
   generating the profile from the silhouette edge.

3. The method of claim 1, wherein generating the profile comprises:

extracting section cuts of the 3D model onto the 2D plane, the section cuts forming cross sections that have a cross-sectional profile of the structural part; and generating the profile from maximum dimensions across the cross sections.

4. The method of claim 1, wherein generating the profile further comprises:

modifying one or more of the dimension measurements by at least one of a predefined dimensional tolerance or according to user input; and regenerating the profile to include the dimension measurements as modified.

5. The method of claim 1, wherein searching the manufacturing database includes data scraping the software tool to extract the dimension measurements to a graphical user interface (GUI) of a search engine for the manufacturing database, the GUI including graphical control elements configured to accept the dimension measurements.

6. The method of claim 1, wherein the manufacture of the structural part is related to a program for production of a machine that includes the structural part, and the dimension measurements of the stock profiles include geometric area, and the respective attributes of the stock profiles include one or more of cost, weight, usage in the program, production quantity, or forecasted quantity, and wherein the multiple-criteria decision analysis is performed based on the multiple selection criteria including multiple ones of minimizing material wastage that is reflected in the geometric area, minimizing one or more of cost or weight, or maximizing one or more of usage in the program, production quantity, or forecasted quantity.

7. The method of claim 1, wherein the multiple-criteria decision analysis is performed using a machine learning algorithm.

8. The method of claim 1, wherein outputting the indication of the selected stock profile includes generating an output display including the profile overlaid on the selected stock profile.

9. The method of claim 8, wherein performing the multiple-criteria decision analysis includes determining an order of priority of the matching stock profiles based on the evaluation, and generating the output display includes generating the output display including the profile overlaid on a subset of the matching stock profiles including the selected stock profile that are higher in the order of priority.

10. An apparatus for manufacture of a structural part, the apparatus comprising:

memory configured to store computer-readable program code for a software tool to determine a template profile for the structural part; and processing circuitry configured to access the memory and execute the computer-readable program code for the software tool, to cause the apparatus to execute the software tool to at least:

access a three-dimensional (3D) model of the structural part;

generate a profile from the 3D model in a two-dimensional (2D) plane, and dimension the profile with dimension measurements;

access a manufacturing database of stock profiles with corresponding dimension measurements and respective attributes;

search the manufacturing database for the stock profiles that match search criteria and that are thereby matching stock profiles, the search criteria including the dimension measurements of the profile as lower bounds of the corresponding dimension measurements;

perform a multiple-criteria decision analysis to evaluate the respective attributes of the matching stock profiles based on multiple selection criteria, and identify a selected stock profile from the matching stock profiles based on the evaluation to determine an order of priority of the matching stock profiles based on the evaluation; and manufacture the structural part from a stock structural part associated with an indication of the selected stock profile, the selected stock profile having a cross-sectional profile that corresponds to the selected stock profile from the 3D model in the 2D plane, wherein the indication of the selected stock profile includes an indication of a subset of the matching stock profiles including the selected stock profile that are higher in the order of priority.

11. The apparatus of claim 10, wherein the apparatus caused to execute the software tool to generate the profile comprises the apparatus caused to execute the software tool to:

project a silhouette edge of the 3D model onto the 2D plane; and generate the profile from the silhouette edge.

12. The apparatus of claim 10, wherein the apparatus caused to execute the software tool to generate the profile comprises the apparatus caused to execute the software tool to:

extract section cuts of the 3D model onto the 2D plane, the section cuts forming cross sections that have a cross-sectional profile of the structural part; and generate the profile from maximum dimensions across the cross sections.

13. The apparatus of claim 10, wherein the apparatus caused to execute the software tool to generate the profile further comprises the apparatus caused to execute the software tool to:

modify one or more of the dimension measurements by at least one of a predefined dimensional tolerance or according to user input; and regenerate the profile to include the dimension measurements as modified.

14. The apparatus of claim 10, wherein the apparatus caused to execute the software tool to search the manufacturing database includes the apparatus caused to execute the software tool to data scrape the software tool to extract the dimension measurements to a graphical user interface (GUI) of a search engine for the manufacturing database, the GUI including graphical control elements configured to accept the dimension measurements.

15. The apparatus of claim 10, wherein the manufacture of the structural part is related to a program for production of a machine that includes the structural part, and the dimension measurements of the stock profiles include geometric area, and the respective attributes of the stock profiles include one or more of cost, weight, usage in the program, production quantity, or forecasted quantity, and wherein the apparatus is caused to execute the software tool to perform the multiple-criteria decision analysis based on the multiple selection criteria including multiple ones of minimizing material wastage that is reflected in the geometric area, minimizing one or more of cost or weight, or maximizing one or more of usage in the program, production quantity, or forecasted quantity.

16. The apparatus of claim 10, wherein the multiple-criteria decision analysis is performed using a machine learning algorithm.

17. The apparatus of claim 10, wherein the apparatus caused to execute the software tool to output the indication of the selected stock profile includes the apparatus caused to execute the software tool to generate an output display including the profile overlaid on the selected stock profile.

18. The apparatus of claim 17, wherein the apparatus caused to execute the software tool to perform the multiple-criteria decision analysis includes the apparatus caused to execute the software tool to determine an order of priority of the matching stock profiles based on the evaluation, and the apparatus caused to execute the software tool to generate the output display includes the apparatus caused to execute the software tool to generate the output display including the profile overlaid on a subset of the matching stock profiles including the selected stock profile that are higher in the order of priority.

19. The method of claim 1, wherein the structural part is an aircraft component.

20. The apparatus of claim 10, wherein the structural part is an aircraft component.

* * * * *